(12) United States Patent
Watanabe et al.

(10) Patent No.: US 10,940,756 B2
(45) Date of Patent: Mar. 9, 2021

(54) FUEL TANK VENT SHUTOFF VALVE

(71) Applicant: Honda Motor Co., Ltd., Tokyo (JP)

(72) Inventors: Daisuke Watanabe, Dublin, OH (US); Hiroshi Hoshino, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 100 days.

(21) Appl. No.: 16/372,835

(22) Filed: Apr. 2, 2019

(65) Prior Publication Data

US 2020/0317045 A1    Oct. 8, 2020

(51) Int. Cl.
*B60K 15/035* (2006.01)
*B60K 15/03* (2006.01)
*F02M 25/08* (2006.01)

(52) U.S. Cl.
CPC .. *B60K 15/03519* (2013.01); *B60K 15/03504* (2013.01); *B60K 2015/03289* (2013.01); *B60K 2015/03509* (2013.01); *B60K 2015/03514* (2013.01); *F02M 25/0836* (2013.01); *Y10T 137/2965* (2015.04)

(58) Field of Classification Search
CPC ........ B60K 15/03519; B60K 15/03504; B60K 2015/03514; B60K 2015/03289; F02M 25/0836; Y10T 137/2965
USPC .......................................................... 137/202
See application file for complete search history.

(56) References Cited

U.S. PATENT DOCUMENTS

| | | | |
|---|---|---|---|
| 6,708,713 B1 * | 3/2004 | Gericke ........... | B60K 15/03519 137/202 |
| 6,915,812 B2 * | 7/2005 | Frohwein ......... | B60K 15/03519 137/202 |
| 7,770,594 B2 | 8/2010 | Kishi | |
| 7,926,506 B2 * | 4/2011 | Kaneko .................. | F16K 24/044 137/202 |
| 8,720,472 B2 | 5/2014 | Kito et al. | |
| 2004/0238034 A1 | 12/2004 | Suzuki et al. | |
| 2013/0160867 A1 * | 6/2013 | Nemeth ........... | B60K 15/03519 137/202 |
| 2017/0350521 A1 | 12/2017 | Ogiwara et al. | |

FOREIGN PATENT DOCUMENTS

| | | |
|---|---|---|
| JP | 2009208673 | 9/2009 |
| JP | 5370270 | 12/2011 |
| WO | 2018085325 | 5/2018 |

* cited by examiner

*Primary Examiner* — Jessica Cahill
*Assistant Examiner* — Patrick C Williams
(74) *Attorney, Agent, or Firm* — Plumsea Law Group, LLC

(57) ABSTRACT

A fuel tank vent shutoff valve is provided with a leak countermeasure for preventing liquid fuel leaking from the vent shutoff valve into an evaporative emissions canister. In one embodiment, the vent shutoff valve includes a case disposed over a valve body. The case includes a floor surface surrounding an opening and a cover disposed over the case. The case also includes a flange structure extending away from the floor surface towards an inside surface of the cover. The inside surface includes an annular wall aligned over the opening and extending towards the floor surface of the case. The annular wall includes a first section having a first height that is greater than a second height of a second section. A free end of the first section extends past a free end of the flange structure of the case to prevent fuel from leaking into the evaporative emissions canister.

20 Claims, 17 Drawing Sheets

FUEL TANK VENT SHUTOFF VALVE

BACKGROUND OF THE INVENTION

1. Field of the Invention

The present invention relates to motor vehicles, and, in particular, to a vent shutoff valve for a fuel tank of a motor vehicle.

2. Description of Related Art

Motor vehicle fuel tank venting systems control the flow of fuel vapor from a vehicle fuel tank to an evaporative emission system, such a carbon canister vapor recovery device. Typically, fuel tank venting systems use valves such as pressure operated control valves, volume operated control or shutoff valves, or rollover valves, to control the passage of vapor to an evaporative emission system. While allowing the passage of vapor, the fuel tank venting systems must also prevent the flow of liquid fuel so that the liquid fuel does not reach and damage the evaporative emission system. Because the fuel tank may be inclined at different angles and orientations as a vehicle moves over varying terrain, the fuel tank venting system must prevent the flow of liquid fuel in a variety of different tank positions, and further, must accommodate a situation in which a valve might leak.

SUMMARY

A fuel tank vent shutoff valve (also referred to as a fuel tank vent shut float) is provided with a leak countermeasure for preventing liquid fuel leaking from the shutoff valve into an evaporative emissions canister.

In one aspect, the invention provides a fuel tank vent shutoff valve comprising: a valve body; a case disposed over the valve body, the case including a floor surface surrounding an opening; a cover disposed over the case, the cover including an exit port; wherein the case includes a flange structure extending away from the floor surface towards an inside surface of the cover; wherein the inside surface of the cover includes an annular wall aligned over the opening and extending away from the inside surface towards the floor surface of the case, the annular wall comprising a first section disposed adjacent to the exit port and a second section disposed opposite the first section, wherein the first section has a first height that is greater than a second height of the second section; and wherein a free end of the first section of the annular wall extends past a free end of the flange structure of the case.

In another aspect, the invention provides a case for a fuel tank vent shutoff valve, the case comprising: a floor surface surrounding an opening, wherein the opening is configured to provide fluid access to a valve body of the fuel tank vent shutoff valve, a flange structure extending away from the floor surface; wherein a free end of the flange structure is configured to extend past a free end of an annular wall of a cover aligned over the opening and extending towards the floor surface of the case.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The example embodiments described herein may be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

Fuel tank vapor recovery systems capture and recover escaping fuel vapor during refueling as well as during operation of the motor vehicle. Vapors escaping from the fuel tank through the vapor recovery system may use an evaporative emissions canister that captures and store fuel vapors that are generated and evacuated from the fuel tank during refueling and operation.

Components of the vapor recovery system may be damaged if liquid fuel is introduced into the evaporative emissions canister. Accordingly, vapor recovery systems attempt to prevent the flow of liquid fuel from the fuel tank to the canister. The example embodiments described herein provide a fuel tank vent shutoff valve with leak countermeasures to prevent liquid fuel flowing from the fuel tank to the evaporative emissions canister. The vent shutoff valve of the example embodiments allows liquid fuel to be contained and provides a path for spilled fuel to drain through the valve and re-enter the fuel tank.

Figure 1:
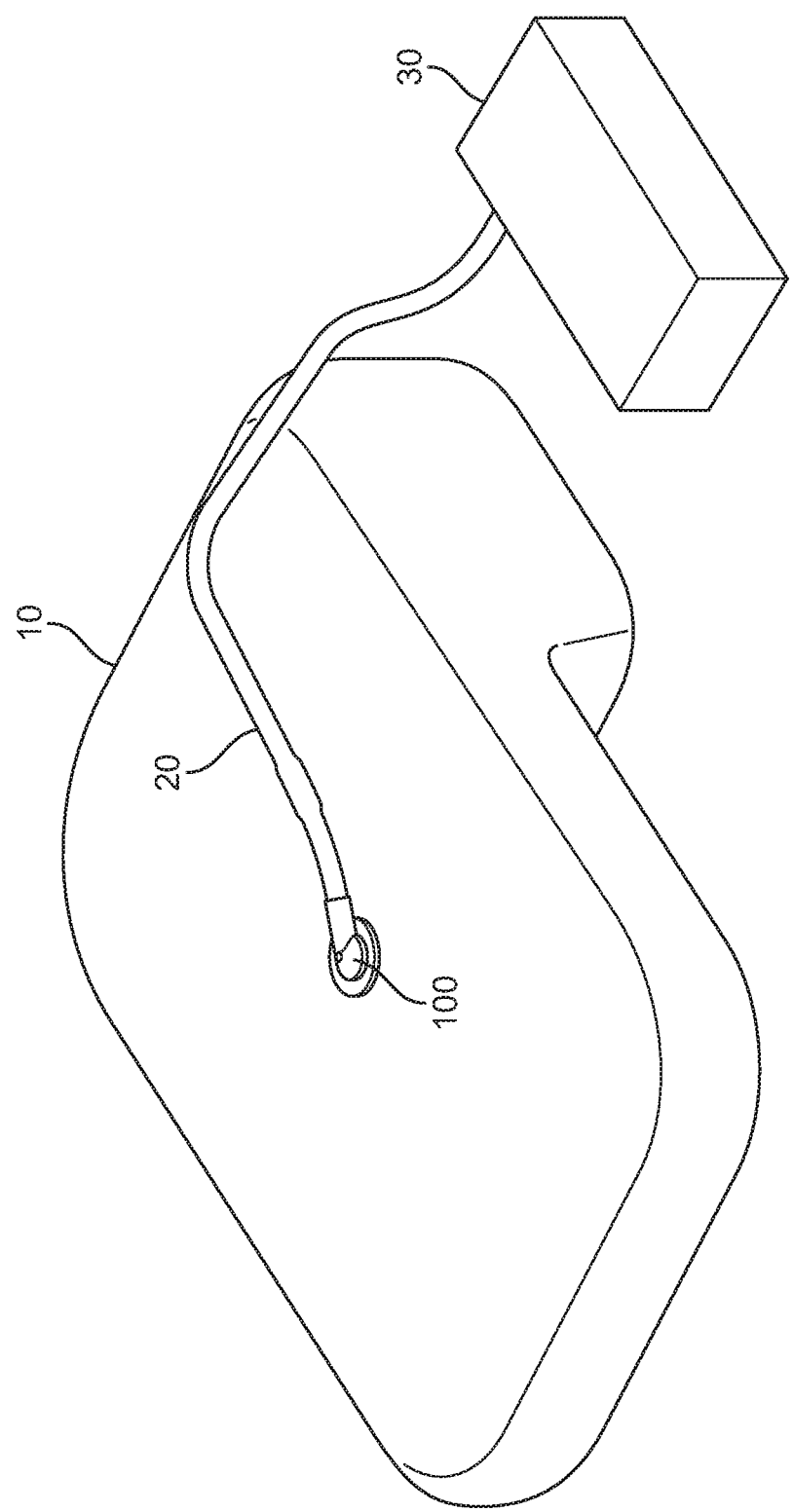
FIG. 1 is an isometric view of an example embodiment of a fuel system including a fuel tank vent shutoff valve.

FIG. 1 illustrates an example embodiment of a fuel system for a motor vehicle in which embodiments of a fuel tank vent shutoff valve described herein may be used. As shown in FIG. 1, the fuel system includes a fuel tank 10. Disposed on top of fuel tank 10 is a fuel tank vent shutoff valve 100. Fuel tank vent shutoff valve 100 includes an exit port or outlet that is connected to a vent tube 20 that leads to an evaporative emissions canister 30. As will be described below, the example embodiments of fuel tank vent shutoff valve 100 provide a leak countermeasure to help prevent liquid fuel from entering into vent tube 20 and leaking into evaporative emissions canister 30.

Figure 2:
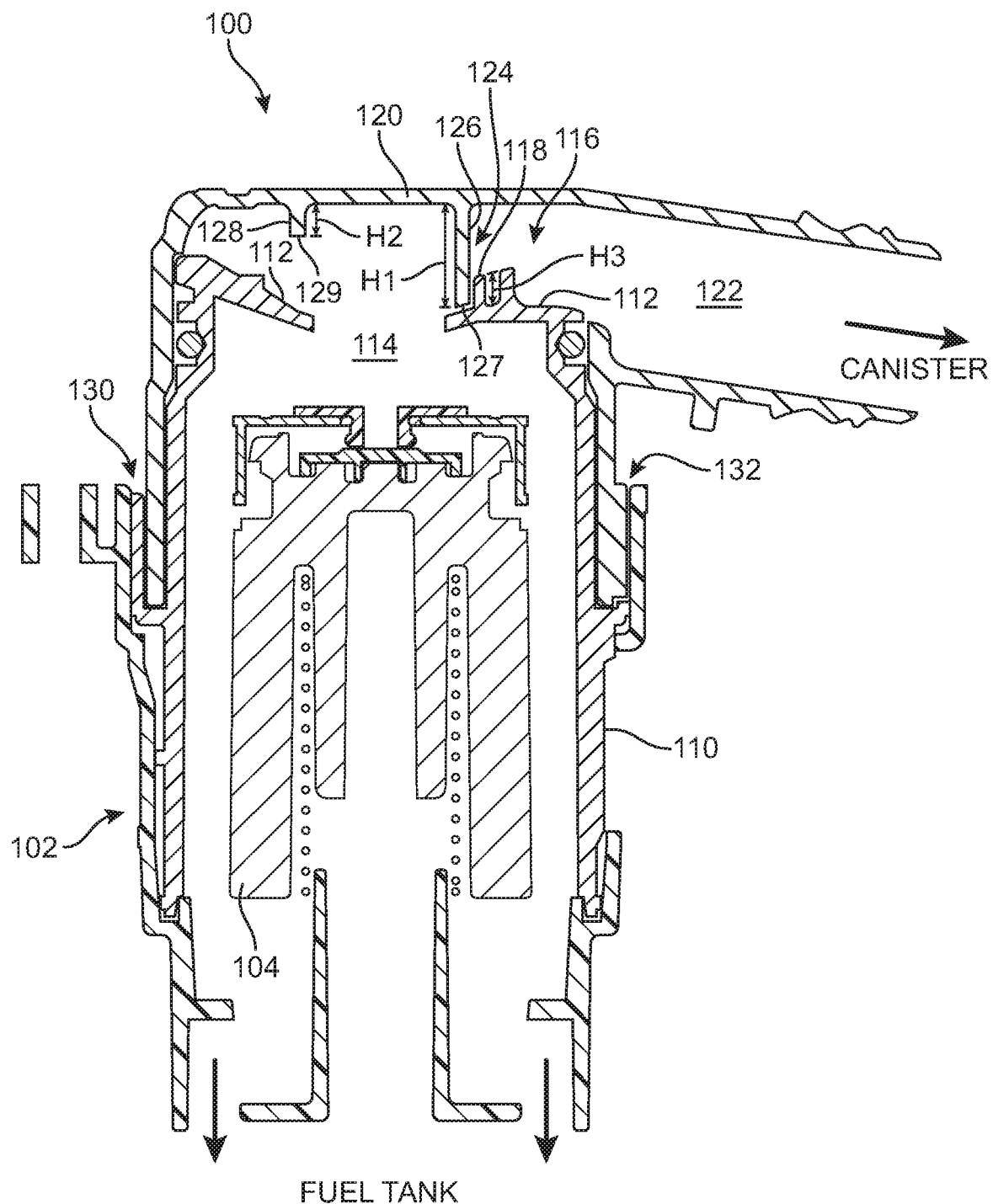
FIG. 2 is a cross-section view of an example embodiment of a fuel tank vent shutoff valve.

Referring now to FIG. 2, a cross-section view of an example embodiment of fuel tank vent shutoff valve 100 is shown. Vent shutoff valve 100 has an outer housing 102 having a generally cylindrical shape. In this embodiment, vent shutoff valve 100 includes a valve body 104 disposed within an interior of vent shutoff valve 100 and enclosed by outer housing 102, Liquid fuel that spills or leaks onto the top of valve body 104 flows around the sides of valve body 104 and out of a drain outlet at the bottom, which leads to a passage for fuel to drain back into the fuel tank of the motor vehicle (e.g., fuel tank 10, shown in FIG. 1).

Vent shutoff valve 100 also includes a case 110. Case 110 forms at least a portion of outer housing 102 of vent shutoff valve 100 and extends upwards away from the drain outlet that leads the fuel tank 10. In this embodiment, case 110 includes a floor surface 112 located above valve body 104 and surrounding an opening 114. In an example embodiment, floor surface 112 of case 110 is configured to channel liquid fuel into opening 114 so that it may flow back into the fuel tank from the drain outlet at the bottom of vent shutoff valve 100.

Vent shutoff valve 100 also includes a cover 120, Cover 120 is disposed over case 110 and includes an exit port 122 that leads to an evaporate emissions canister. Cover 120 forms a top portion of vent shutoff valve 100 and may also form at least a portion of outer housing 102 of vent shutoff valve 100. In this embodiment, cover 120 includes a bottom portion that is configured to engage with tabs 130, 132 located on case 110 to secure the two components together. For example, tabs 130, 132 on case 110 may engage the bottom portion of cover 120 with friction or a locking mechanism to releasably connect case 110 and cover 120.

In an example embodiment, components of case 110 and cover 120 cooperatively form a leak countermeasure for vent shutoff valve 100 to prevent liquid fuel from entering into the evaporative emissions canister through exit port 122, As shown in FIG. 2, case 110 includes a flange structure 116 that extends away from floor surface 112 towards an inside surface of cover 120. The inside surface of cover 120 includes an annular wall 124 that is aligned over opening 114 and extends towards floor surface 112 of case 110. In one embodiment, annular wall 124 has a circular shape that is similarly sized or slightly larger than a circular shape of opening 114.

Annular wall 124 of cover 120 has a stepped configuration with a first section 126 disposed adjacent to exit port 122 and a second section 128 disposed opposite first section 126. In this embodiment, first section 126 extends from the inside surface of cover 120 to a free end 127 and has a first height H1. Second section 128 extends from the inside surface of cover 120 to a free end 129 and has a second height H2. First height H1 of first section 126 is greater than second height H2 of second section 128. In one embodiment, first height H1 is approximately three times greater than second height H2. For example, in one embodiment, second height H2 of second section 128 of annular wall 124 may be approximately 3.4 mm and first height H1 of first section 126 may be approximately 10.5 mm. It should be understood that first height H1 may be larger or smaller and second height H2 may also be proportionally larger or smaller.

In an example embodiment, free end 127 of first section 126 of annular wall 124 of cover 120 extends past a free end 118 of flange structure 116 on floor surface 112 of case 110. In this embodiment, free end 118 of flange structure 116 extends approximately a third height H3 from floor surface 112. In one embodiment, third height H3 is approximately 3 mm. It should be understood that third height H3 may be larger or smaller. With this configuration, free end 127 of first section 126 of annular wall 124 of cover 120 and free end 118 of flange structure 116 of case 110 cooperate to block liquid fuel from entering into exit port 122.

Figure 3:
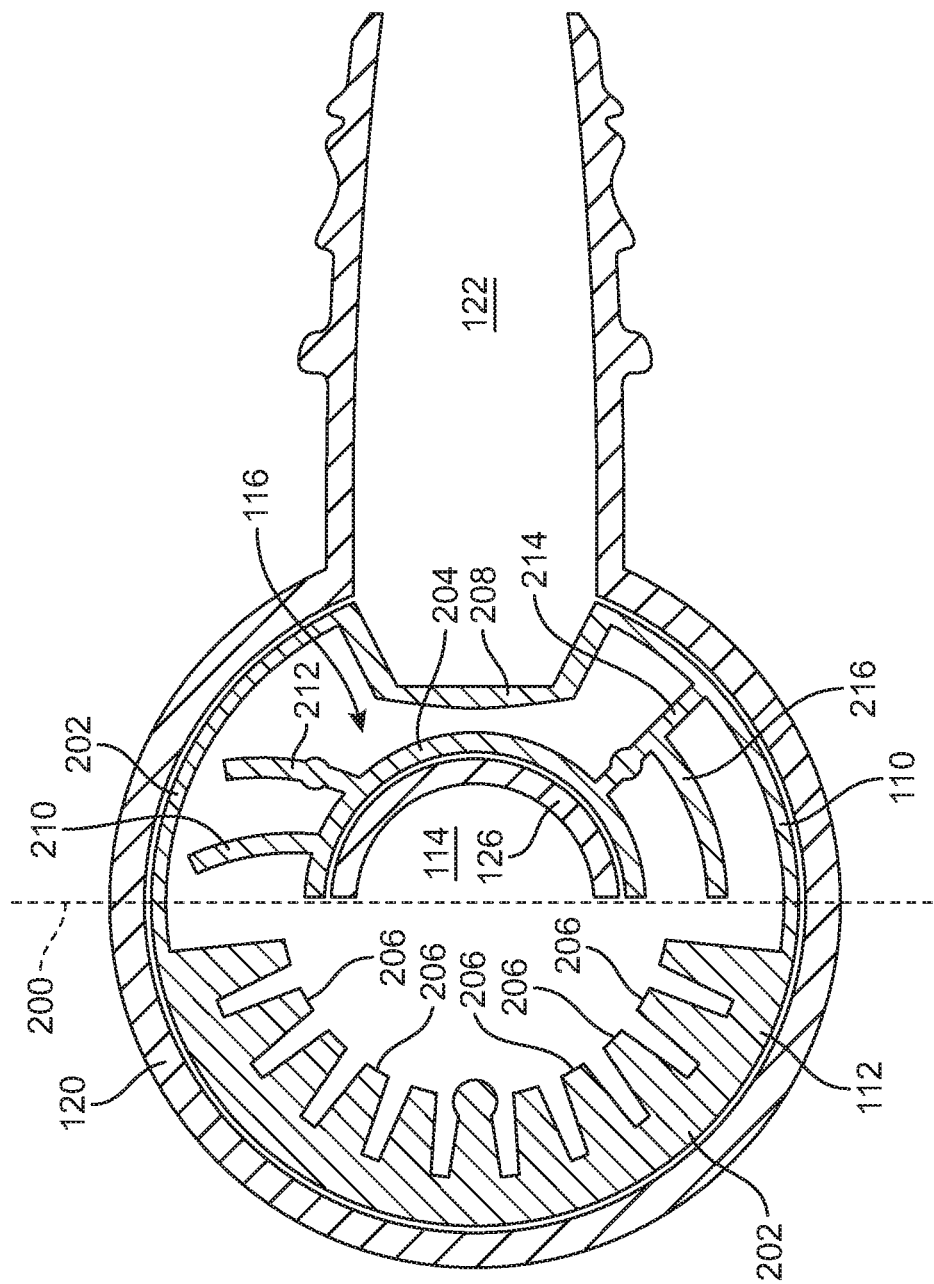
FIG. 3 is a top section view of an example embodiment of a fuel tank vent shutoff valve.

FIG. 3 is a top section view of fuel tank vent shutoff valve 100 looking down towards floor surface 112 of case 110. In this embodiment, an axis 200 is shown for purposes of describing positions of components of vent shutoff valve 100 relative to exit port 122 leading to the evaporative emissions canister (e.g., evaporative emissions canister 30, shown in FIG. 1) For example, components located on the same side of axis 200 as exit port 122 may be referred to as being on the exit side, whereas components on the other side of axis 200 opposite exit port 122 may be referred to as being on the far side.

In an example embodiment, floor surface 112 of case 110 may have an approximately circular shape defined by an outer peripheral portion 202. In this embodiment, outer peripheral portion 202 is a ring that extends around the circumference of floor surface 112 of case 110. Flange structure 116 extending away from floor surface 112 of case 110 includes an inner semi-circular portion 204. Inner semi-circular portion 204 is located on the exit side of case 110 and is adjacent to opening 114 in floor surface 112.

In some embodiments, first section 126 of annular wall 124 of cover 120 may be disposed adjacent to inner semi-circular portion 204 of case 110. As shown in FIG. 3, first section 126 of annular wall 124 of cover 120 may be located between opening 114 and inner semi-circular portion 204. In some embodiments, first section 126 of annular wall 124 of cover 120 and inner semi-circular portion 204 of case 110 may have corresponding similar semi-circular shapes separated by a small gap in between. With this configuration, first section 126 of annular wall 124 and inner semi-circular portion 204 of flange structure 116 act together to provide a barrier on the exit side of vent shutoff valve 100 to prevent fuel from leaking into exit port 122 and leading to the evaporative emissions canister.

As shown in FIG. 3, flange structure 116 includes a plurality of projections 206 disposed on the far side of case 110 opposite exit port 122. Plurality of projections 206 extend upwards from floor surface 112 of case 110 in a saw-like configuration, with triangular or trapezoidal raised fingers separated by spaces or gaps. In this embodiment, plurality of projections 206 extends approximately 180 degrees around the circumference of floor surface 112 on the far side of case 110. The tips of the fingers of plurality of projections 206 point towards opening 114 at the center of case 110 and slope in a downward manner. For example, fuel that hits plurality of projections 206 from the spaces or gaps in between has its kinetic energy reduced, similar to a wave-dissipating block. With this configuration, liquid fuel that leaks onto floor surface 112 on the far side of case 110 may be directed by plurality of projections 206 into opening 114 to drain back into the fuel tank.

In this embodiment, outer peripheral portion 202 includes an indent 208. Indent 208 is substantially aligned with exit port 122. As shown in FIG. 3, indent 208 is a section of outer peripheral portion 202 of flange structure 116 that extends inward towards opening 114 and is located adjacent to inner semi-circular portion 204.

In some embodiments, flange structure 116 of case 110 includes a plurality of finger members. In this embodiment, flange structure 116 includes at least a first finger member 210 and a second finger member 212 that extend out from inner semi-circular portion 204 of flange structure 116 towards outer peripheral portion 202. Ends of first finger member 210 and second finger member 212 are spaced apart from outer peripheral portion 202. In some cases, first finger member 210 and second finger member 212 may have an arcuate curved shape.

In some embodiments, flange structure 116 of case 110 may also include a connecting member 214. Connecting member 214 is attached at one end to inner semi-circular portion 204 and at the other end to outer peripheral portion 202. With this configuration, connecting member 214 connects inner semi-circular portion 204 and outer peripheral portion 202 of flange structure 116.

Additionally, in some embodiments, the plurality of finger members of flange structure 116 may further include a third finger member 216. Third finger member 216 extends outward from connecting member 214. As shown in FIG. 3, third finger member 216 extends approximately perpendicularly from a side of connecting member 214 disposed facing away from exit port 122. In some embodiments, third finger member 216 may have an arcuate curved shape that corresponds to and is generally parallel to outer peripheral portion 202 and inner semi-circular portion 204 of flange structure 116.

Figure 4:
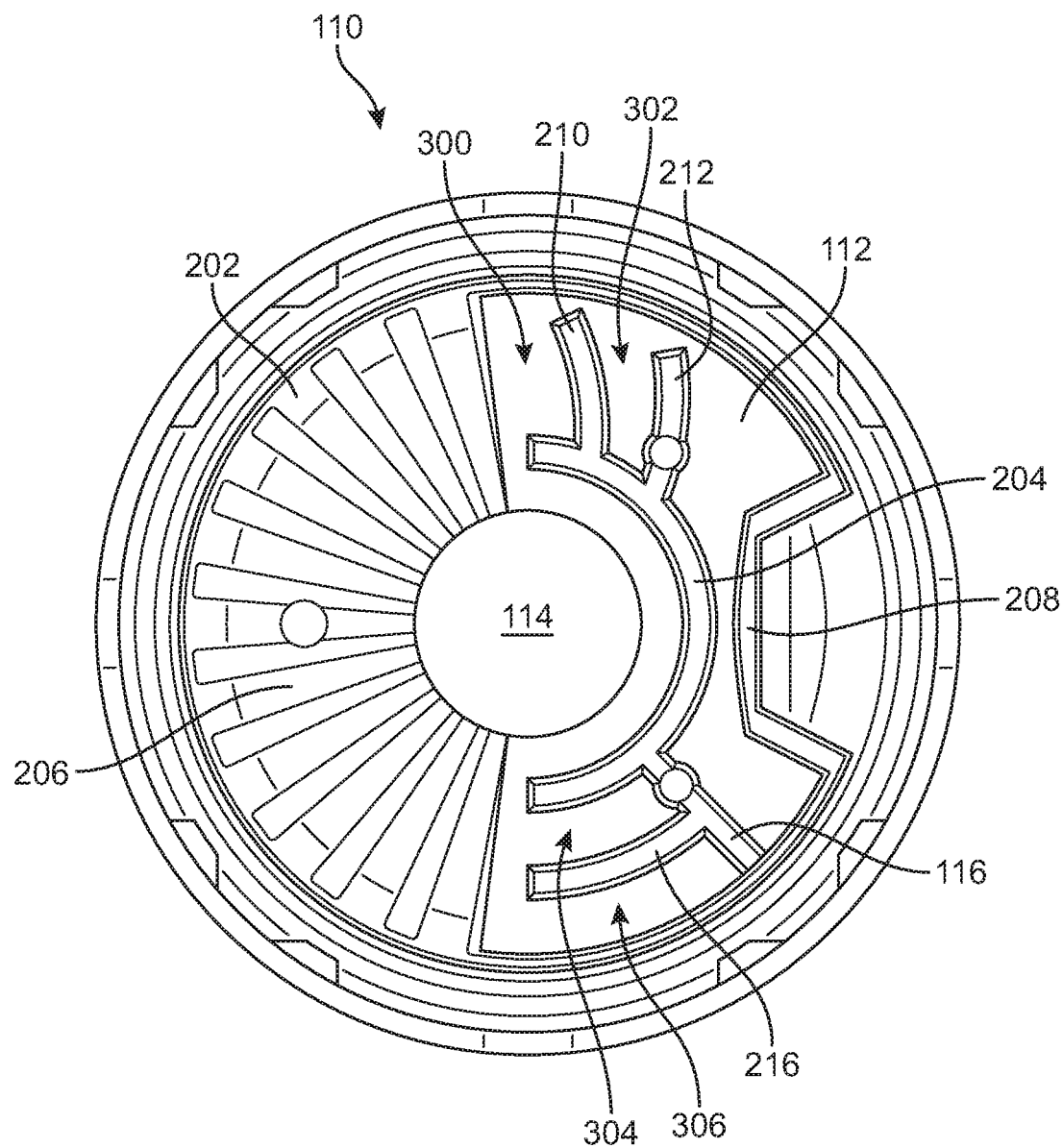
FIG. 4 is an overhead view of an example embodiment of a case of a fuel tank vent shutoff valve.

Referring now to FIG. 4, an overhead view of floor surface 112 of case 110 is shown according to an example embodiment. As shown in FIG. 4, plurality of projections 206 on the far side of floor surface 112 of case 110 have a tapered configuration with the end nearest opening 114 being smaller than the end nearest outer peripheral portion 202. As described above, plurality of projections 206 are raised above floor surface 112 and slope in a downward direction towards opening 114. With this configuration, liquid fuel that spills onto plurality of projections 206 is channeled down into opening 114 and can return to the fuel tank.

In some embodiments, the plurality of finger members of flange structure 116 may be configured to trap and contain liquid fuel on floor surface 112 of case 110 by forming one or more liquid catch areas. Liquid catch areas trap the fuel from entering exit port 122 leading to the evaporative emissions canister. As shown in FIG. 4, a first liquid catch area 300 is formed by first finger member 210 and part of inner semi-circular portion 204. First liquid catch area 300 is configured to trap fuel from flowing towards exit port 122.

A second liquid catch area 302 is formed by second finger member 212 and part of inner semi-circular portion 204. In some embodiments, a side of first finger member 210 facing towards the exit port side of case 110 may also assist with trapping fuel in second liquid catch area 302. In some embodiments, additional liquid catch areas may also be located on case 110. As shown in FIG. 4, a third liquid catch area 304 is formed by third finger member 216 and part of inner semi-circular portion 204. A fourth liquid catch area 306 may also be formed by third finger member 216 and part of outer peripheral portion 202 of case 110. With this arrangement, the plurality of liquid catch areas 300, 302, 304, 306 may be configured to catch and trap liquid fuel from entering exit port 122 leading to the evaporative emissions canister.

Additionally, in some embodiments, plurality of liquid catch areas 300, 302, 304, 306 are sloped so that trapped fuel is directed by the finger members on floor surface 112 in a downward direction towards opening 114 to be returned to the fuel tank while the motor vehicle is being driven and experiences a variety of angles or tilting.

Figure 5:
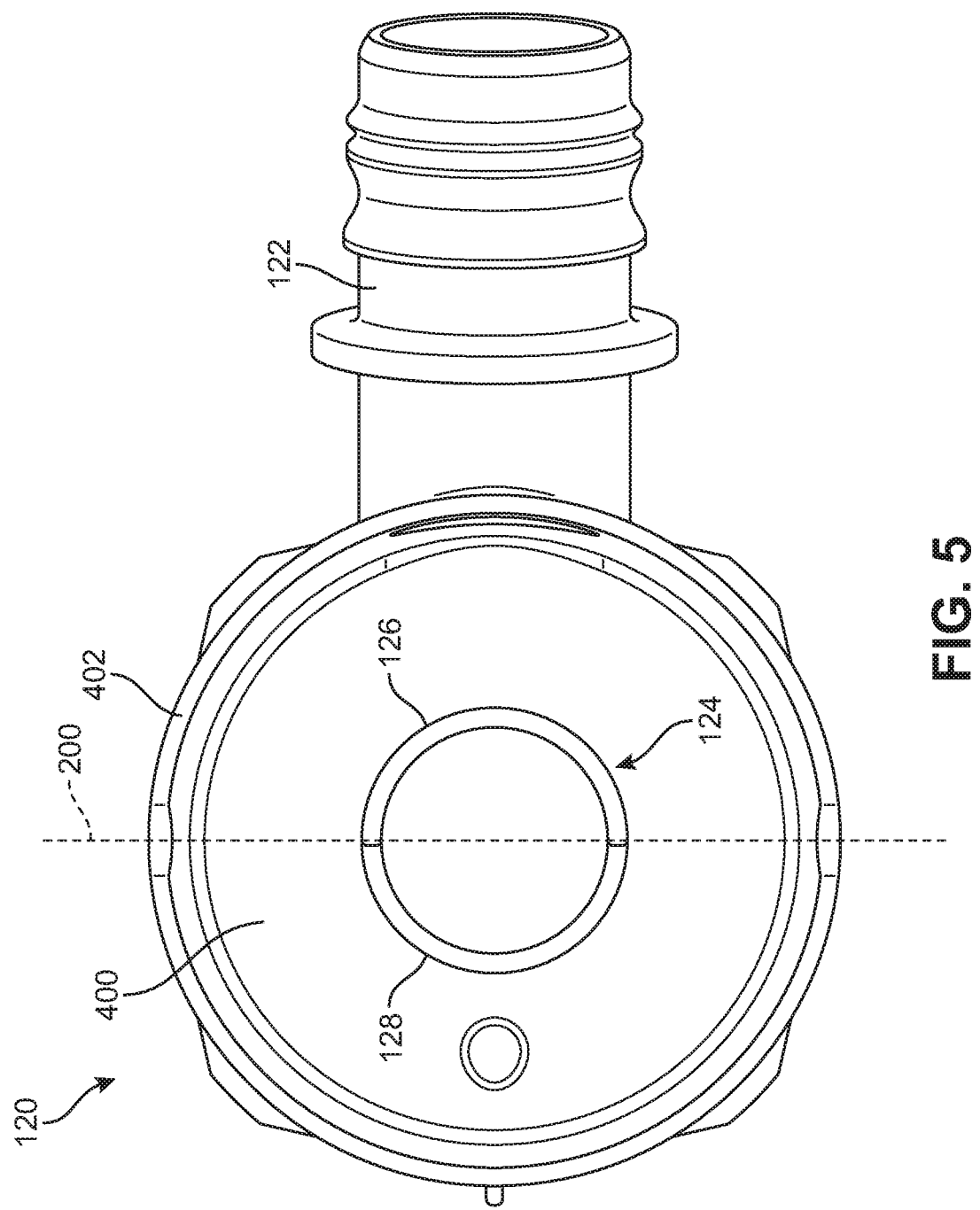
FIG. 5 is an underside view of an example embodiment of a cover of a fuel tank vent shutoff valve.

Referring now to FIG. 5, an underside view of an example embodiment of cover 120 of vent shutoff valve 100 is shown. As described above, an inside surface 400 of cover 120 includes annular wall 124 that is configured to be aligned over opening 114 in floor surface 112 of case 110. Annular wall 124 of cover 120 has a stepped configuration with first section 126 disposed adjacent to exit port 122 and second section 128 disposed opposite first section 126. In this embodiment, axis 200 extends through annular wall 124 between first section 126 and second section 128. That is, where annular wall 124 becomes stepped from second height H2 of second section 128 to the greater first height H1 of first section 126.

In this embodiment, an outer rim 402 of cover 120 is facing upwards. As described above, a bottom portion of outer rim 402 may be configured to engage with tabs 130, 132 located on case 110 (shown in FIG. 1) to secure case 110 and cover 120 together.

Figure 6:
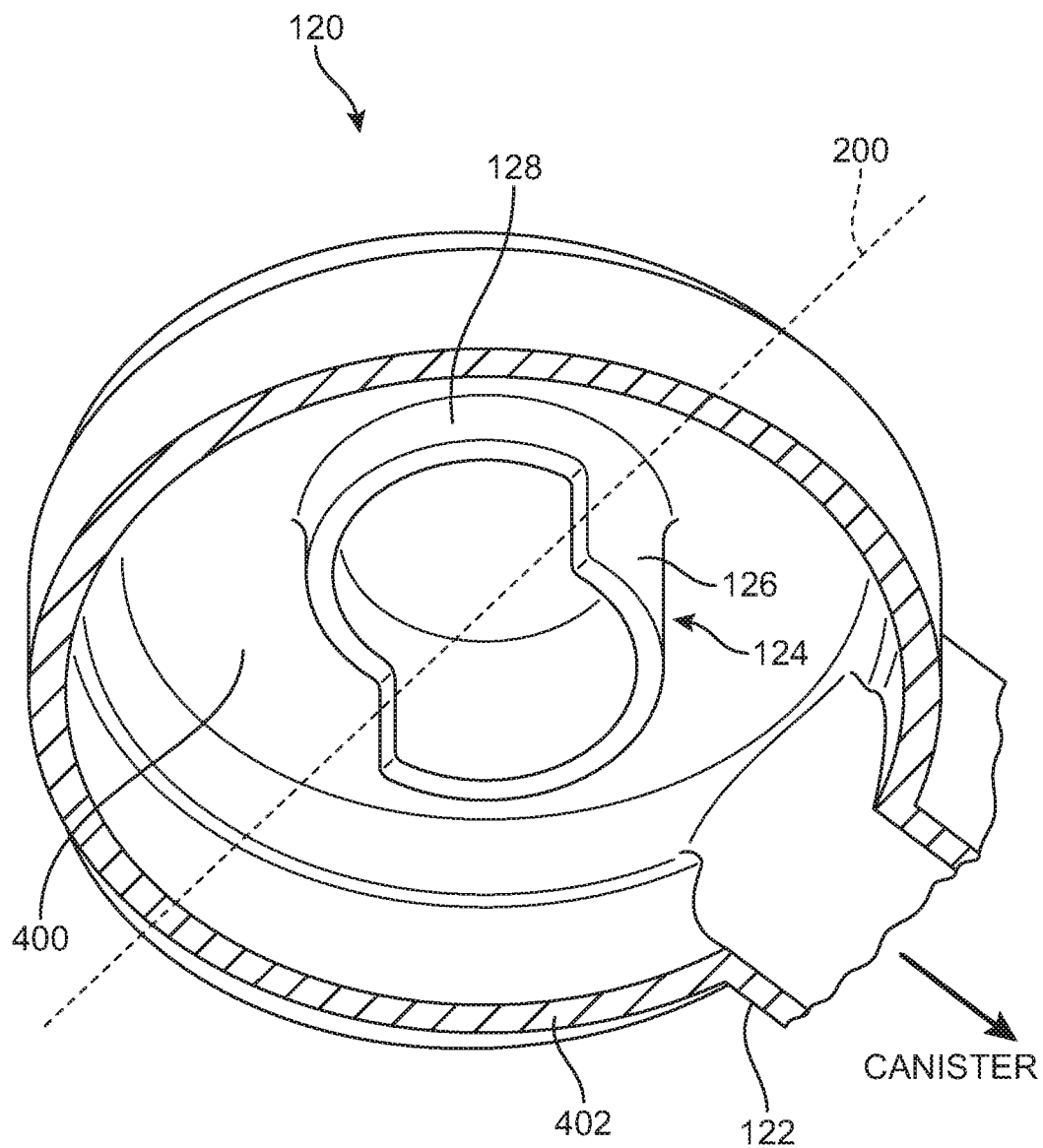
FIG. 6 is an isometric underside view of the cover of FIG. 5.

FIG. 6 illustrates an isometric underside view of cover 120 to better show the stepped configuration of annular wall 124. In this embodiment, inside surface 400 of cover 120 is visible, including annular wall 124. As described above, annular wall 124 has a stepped configuration, with taller first section 126 and shorter second section 128 divided by axis 200. In one embodiment, annular wall 124 is a substantially continuous ring that is configured to align over opening 114 in floor surface 112 of case 110. First section 126 of annular wall 124 is disposed adjacent to exit port 122 on the exit side of vent shutoff valve 100. With this arrangement, portions of annular wall 124 of cover 120 and portions of flange structure 116 of case 110 cooperate to form a leak countermeasure that blocks liquid fuel from entering into exit port 122 leading to the evaporative emissions canister.

FIGS. 1-6 illustrate an example embodiment of a leak countermeasure for a vent shutoff valve for a fuel tank, specifically, vent shutoff valve 100, as described above. Various alternate embodiments of a fuel tank vent shutoff valve having other leak countermeasures are also provided, as shown in FIGS. 7-19 below.

Figure 7:
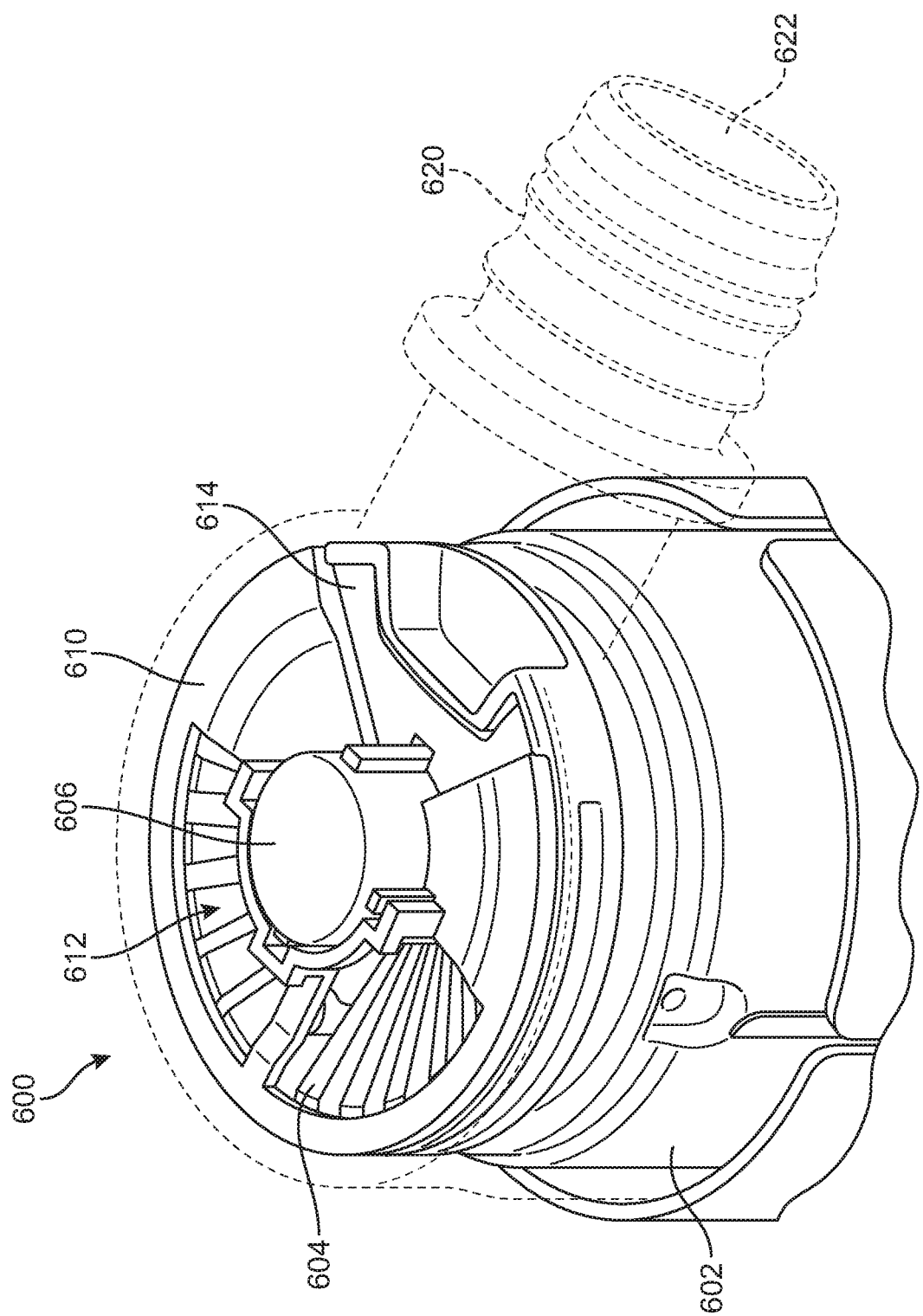
FIG. 7 is an isometric view of an example embodiment of a blocker plate for a fuel tank vent shutoff valve.

FIGS. 7-11 illustrate an example embodiment of a blocker plate for a fuel tank vent shutoff valve that provides a leak countermeasure. Referring now to FIG. 7, an isometric view of an example embodiment of a blocker plate 610 for a fuel tank vent shutoff valve 600 is shown. In this embodiment, vent shutoff valve 600 has a similar configuration as vent shutoff valve 100, described above. Vent shutoff valve 600 includes a case 602 and a cover 620 disposed over case 602. Additionally, a valve body (not shown) is disposed within the interior of vent shutoff valve 600.

As shown in FIG. 7, case 602 includes a floor surface 604 surrounding a central hub 606. In this embodiment, however, the leak countermeasure for vent shutoff valve 600 is provided by blocker plate 610. Blocker plate 610 is configured to fit on top of case 602. Specifically, blocker plate 610 has a shape that corresponds to floor surface 604 so that blocker plate 610 rests above and conforms to floor surface 604 of case 602. In an example embodiment, a gap is located between blocker plate 610 and floor surface 604 of case 602. For example, in one embodiment, the gap between blocker plate 610 and floor surface 604 of case 602 is approximately 0.5 mm. With this configuration, liquid fuel that spills onto floor surface 604 of case 602 is trapped in the gap between blocker plate 610 and floor surface 604 and can drain back into the fuel tank through vent shutoff valve 600.

In this embodiment, blocker plate 610 includes a center aperture 612 that is configured to fit over central hub 606 of case 602 such that central hub 606 extends through center aperture 612, Additionally, blocker plate 610 includes a stepped indented region 614 that corresponds to and conforms to the shape of an indent in case 602 adjacent to an exit port 622 in cover 620. With this arrangement, blacker plate 610 is configured to provide a leak countermeasure for vent shutoff valve 600 that prevents liquid fuel from entering into exit port 622 leading to the evaporative emissions canister.

Figure 8:
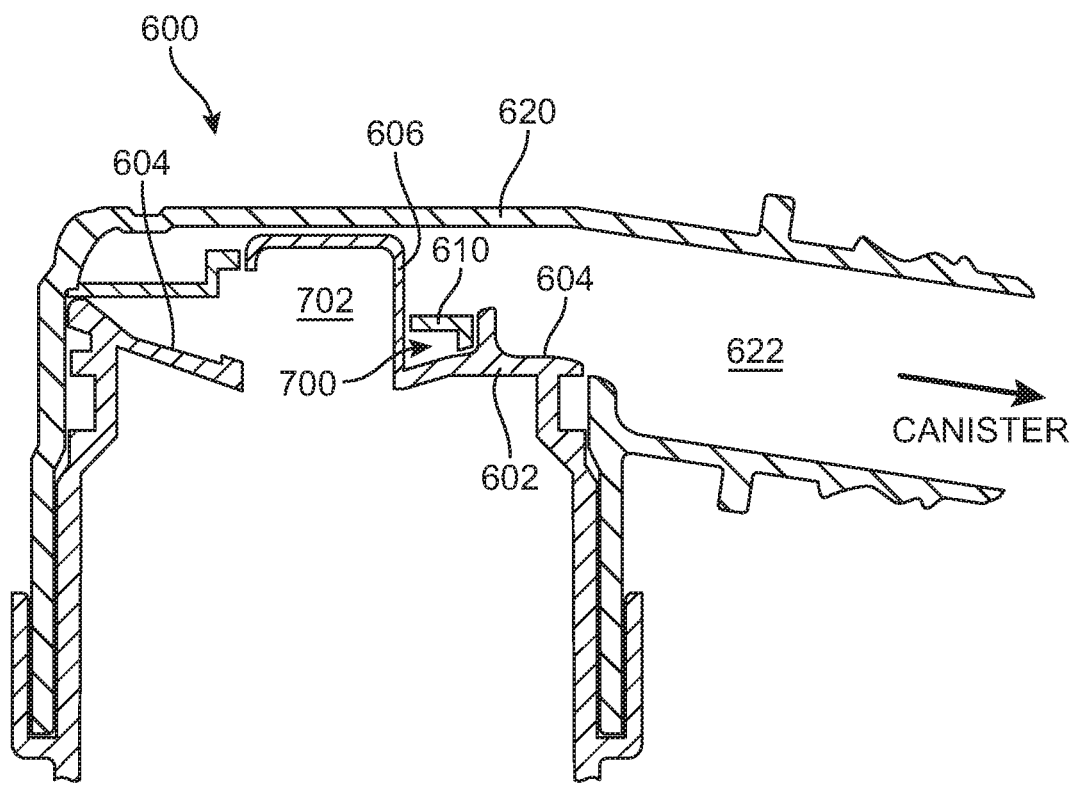
FIG. 8 is a cross-section view of an example embodiment of a fuel tank vent shutoff valve with the blocker plate of FIG. 7.

Referring now to FIG. 8, a cross-section view of an example embodiment of fuel tank vent shutoff valve 600 with blocker plate 610 is shown. In this embodiment, a portion of blocker plate 610 is shown disposed above floor surface 604 of case 602. Additionally, a gap 700 between blocker plate 610 and floor surface 604 of case 602 is illustrated on the exit side of vent shutoff valve 600 adjacent to exit port 622 of cover 620. On the far side of vent shutoff valve 600 opposite exit port 622, an opening 702 in central hub 606 is provided to allow liquid fuel to flow back into vent shutoff valve 600 to the fuel tank.

Figure 9:
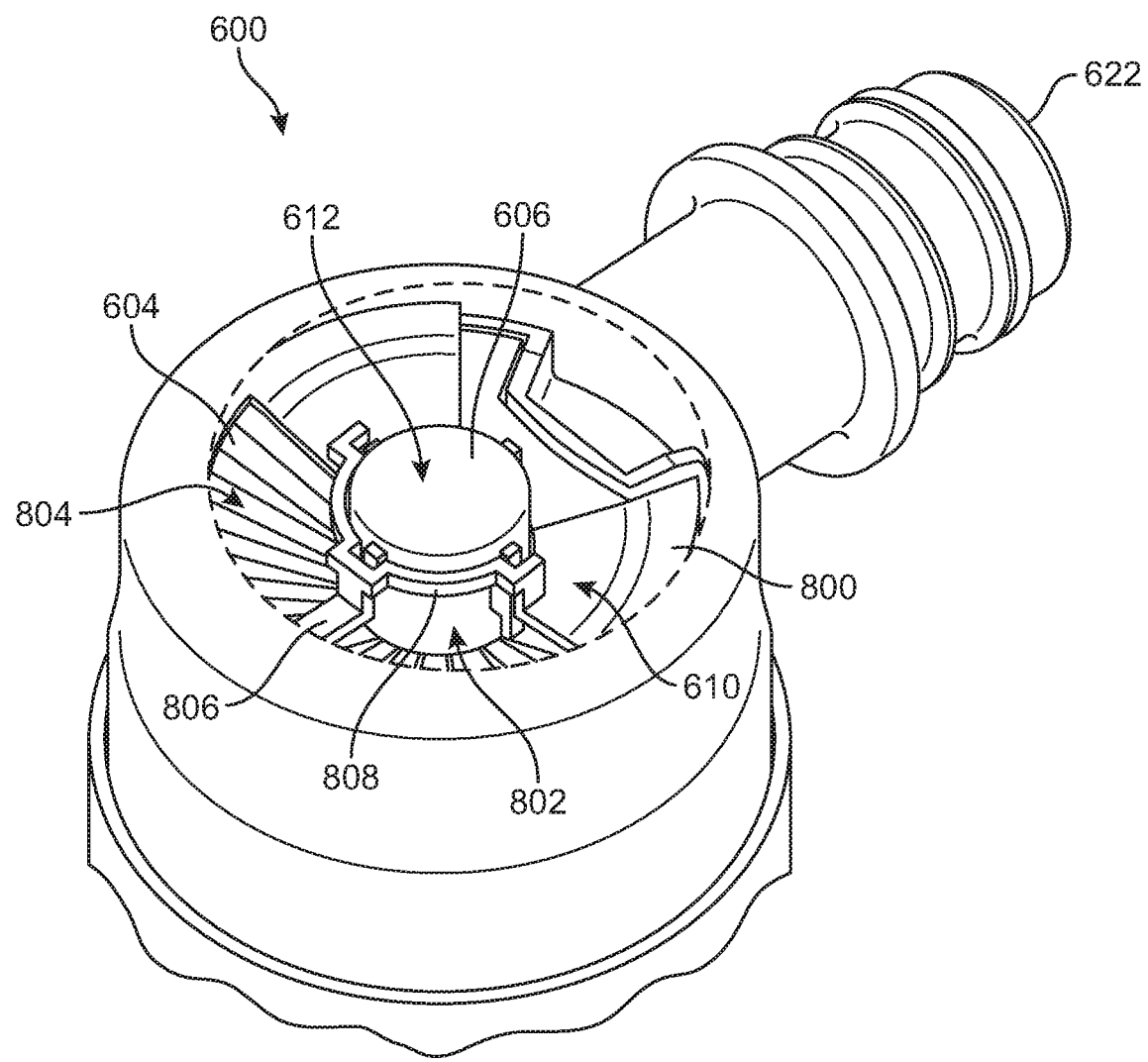
FIG. 9 is another isometric view of the example embodiment of the blocker plate for a fuel tank vent shutoff valve.

FIG. 9 is another isometric view of the example embodiment of blocker plate 610 for vent shutoff valve 600. In this embodiment, blocker plate 610 has a first portion 800 forming a substantially continuous surface on the exit side of vent shutoff valve 600 adjacent to exit port 622. Blocker plate 610 also includes a second portion opposite first portion 800 that is substantially open such that floor surface 604 of case 602 is uncovered. In this embodiment, the second portion of blocker plate 610 includes a first opening 802 and a second opening 804. With this arrangement, any fuel that spills onto first portion 800 of blocker plate 610 is directed back towards the far side of vent shutoff valve 600 where the fuel can drain through opening 702 in central hub 606 of case 602.

In an example embodiment, first opening 802 and second opening 804 are separated by a connecting member 806 that joins an outer peripheral edge of blocker plate 610 with an inner hub ring 808. Inner hub ring 808 extends partially around central hub 606 of case 602 and forms part of the perimeter around center aperture 612 of blocker plate 610. In some embodiments, inner hub ring 808 may include corresponding notches configured to receive tabs disposed on central hub 606. The notches and tabs may assist with holding blocker plate 610 in place above floor surface 604 of case 602.

In this embodiment, the second portion of blocker plate 610 is provided with first opening 802 and second opening 804 so as to allow liquid fuel that spills onto floor surface 604 of case 602 to drain through opening 702 in central hub 606 facing away from exit port 622. In contrast, first portion 800 of blocker plate 610 is a substantially continuous surface that covers the majority of floor surface 604 of case 602 directly in front of exit port 622 to prevent the spilled liquid fuel from entering into exit port 622 and leaking into the evaporative emissions canister. With this arrangement, blocker plate 610 provides a leak countermeasure for vent shutoff valve 600.

Figure 10:
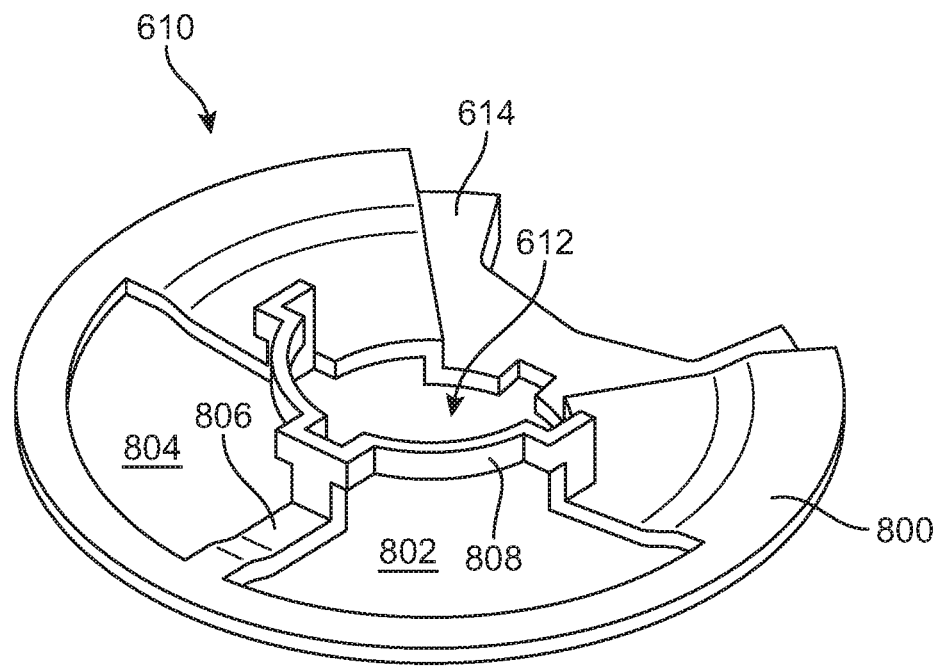
FIG. 10 is an isometric view of the example embodiment of the blacker plate of FIG. 7.

FIGS. 10 and 111 are isometric views of the example embodiment of blocker plate 610, Referring now to FIG. 10, an isometric view of a top side of blocker plate 610 is shown. In this embodiment, first portion 800 of blocker plate 610 includes stepped indented region 614. Stepped indented region 614 in blocker plate 610 is configured to correspond to and conform with the shape of a similarly arranged indent in floor surface 604 of case 602. Stepped indented region 614 is located adjacent to exit port 622 of cover 620 within vent shutoff valve 600. Additionally, at stepped indented region 614 of first portion 800 of blocker plate 610, the substantially continuous surface of first portion 800 of blocker plate 610 steps down in height.

Figure 11:
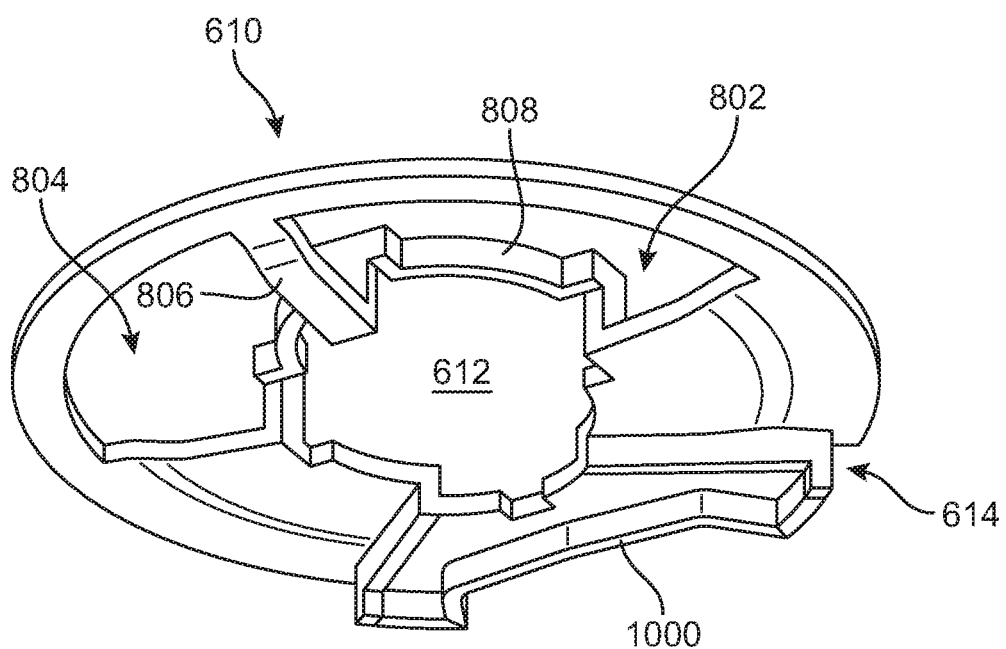
FIG. 11 is an isometric underside view of the example embodiment of the blocker plate of FIG. 7.

FIG. 11 is an isometric view of the underneath side of blocker plate 610. In this embodiment, the underside of stepped indented region 614 of first portion 800 of blocker plate 610 is visible. In an example embodiment, the underside of stepped indented region 614 may further include a lip 1000 that extends around the perimeter of stepped indented region 614 underneath blocker plate 610. Lip 1000 may be configured to block liquid fuel from entering into exit port 622 of cover 620. That is, lip 1000 provides a physical barrier so that fuel that leaks onto floor surface 604 of case 602 on the exit side of vent shutoff valve 600 is not permitted to flow into exit port 622.

Figure 12:
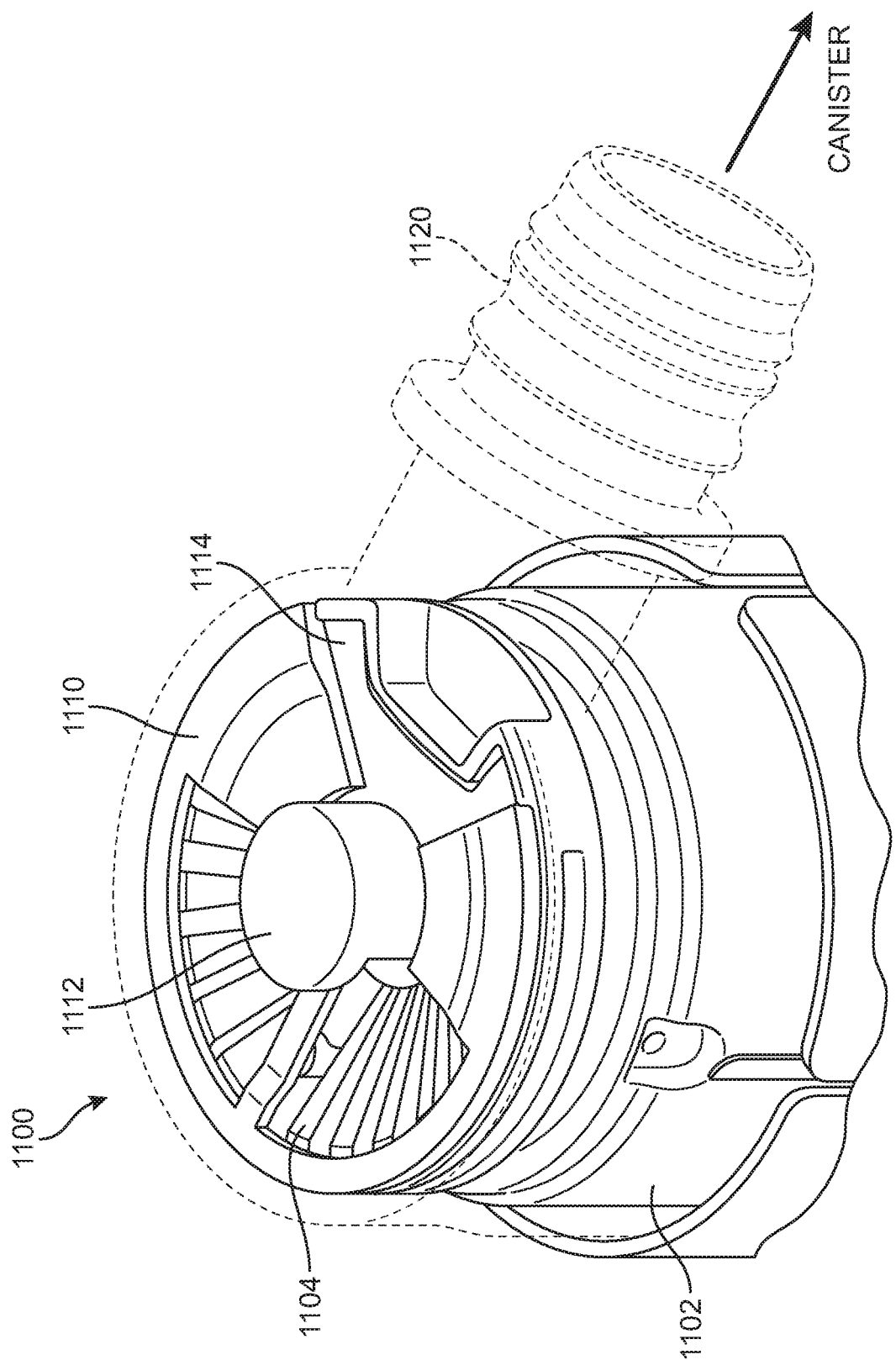
FIG. 12 is an isometric view of an alternate embodiment of a blocker plate for a fuel tank vent shutoff valve.

FIGS. 12-16 illustrate an alternate embodiment of a blocker plate for a fuel tank vent shutoff valve that provides a leak countermeasure. Referring now to FIG. 12, an isometric view of an alternate embodiment of a blocker plate 1110 for a fuel tank vent shutoff valve 1100 is shown. In this embodiment, vent shutoff valve 1100 has a similar configuration as vent shutoff valve 100 and vent shutoff valve 600, described above. Vent shutoff valve 1100 includes a case 1102 and a cover 1120 disposed over case 1102. Additionally, a valve body (not shown) is disposed within the interior of vent shutoff valve 1100.

Figure 13:
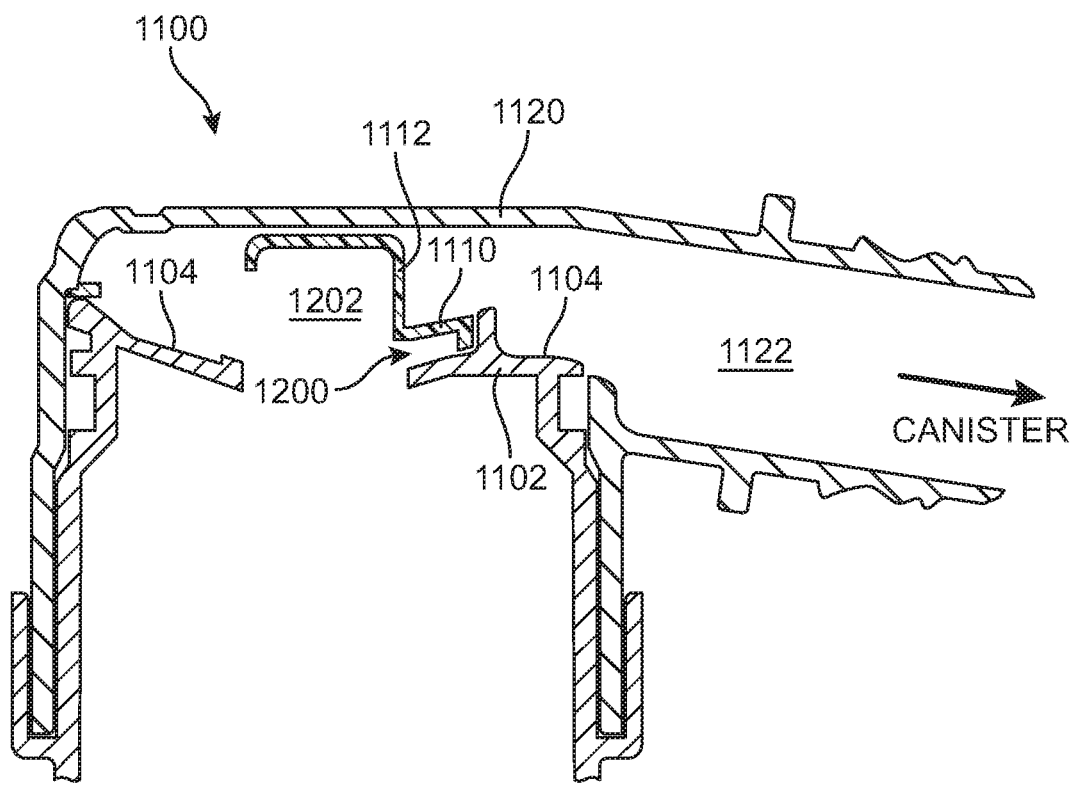
FIG. 13 is a cross-section view of a fuel tank vent shutoff valve with the alternate embodiment of the blocker plate of FIG. 12.

As shown in FIG. 12, case 1102 includes a floor surface 1104 surrounding an opening 1202 (shown in FIG. 13). In this embodiment, the leak countermeasure for vent shutoff valve 1100 is provided by blocker plate 1110. Blocker plate 1110 is configured to fit on top of case 1102. Specifically, blocker plate 1110 has a shape that corresponds to floor surface 1104 so that blocker plate 1110 rests above and conforms to floor surface 1104 of case 1102. In an example embodiment, a gap is located between blocker plate 1110 and floor surface 1104 of case 1102. With this configuration, liquid fuel that spills onto floor surface 1104 of case 1102 is trapped in the gap between blocker plate 1110 and floor surface 1104 and can drain back into the fuel tank through vent shutoff valve 1100.

In this embodiment, blocker plate 1110 includes an integrated hood 1112 that is configured to fit over opening 1202

(shown in FIG. 13) of case 1102 such that integrated hood 1112 is aligned substantially over opening 1202. Additionally, blocker plate 1110 includes a stepped indented region 1114 that corresponds to and conforms to the shape of an indent in case 1102 adjacent to an exit port 1122 in cover 1120. With this arrangement, blocker plate 1110 is configured to provide a leak countermeasure for vent shutoff valve 1100 that prevents liquid fuel from entering into exit port 1122 leading to the evaporative emissions canister.

Referring now to FIG. 13, a cross-section view of an example embodiment of fuel tank vent shutoff valve 1100 with blocker plate 1110 is shown. In this embodiment, a portion of blocker plate 1110 is shown disposed above floor surface 1104 of case 1102. Additionally, a gap 1200 between blocker plate 1110 and floor surface 1104 of case 1102 is illustrated on the exit side of vent shutoff valve 1100 adjacent to exit port 1122 of cover 1120. On the far side of vent shutoff valve 1100 opposite exit port 122, opening 1202 in case 1102 is disposed under integrated hood 1112 to allow liquid fuel to be channeled off floor surface 1104 and flow back into vent shutoff valve 1100 to the fuel tank.

Figure 14:
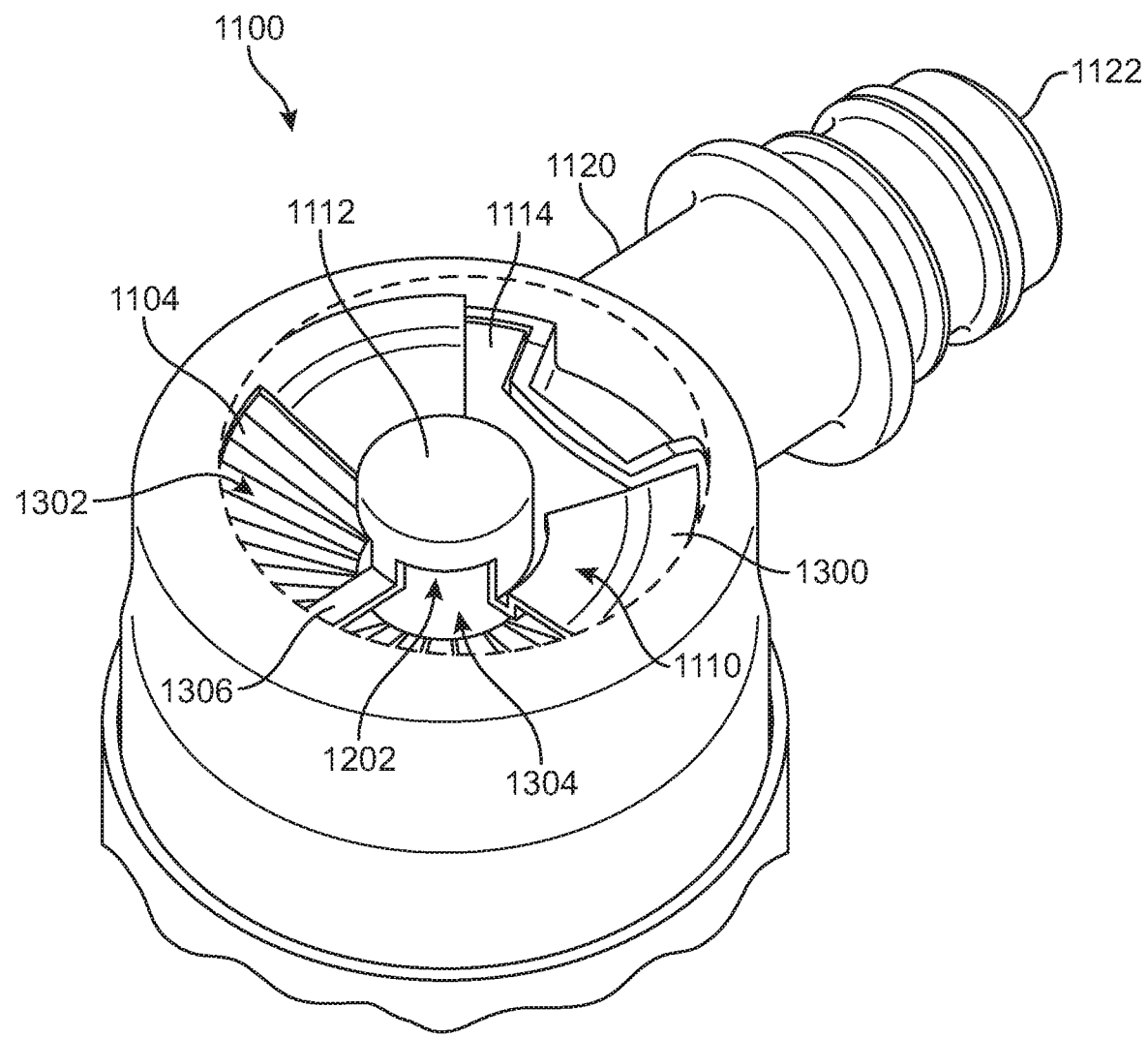
FIG. 14 is another isometric view of the alternate embodiment of the blocker plate for a fuel tank vent shutoff valve.

FIG. 14 is another isometric view of the example embodiment of blocker plate 1110 for vent shutoff valve 1100. In this embodiment, blocker plate 1110 has a first portion 1300 forming a substantially continuous surface on the exit side of vent shutoff valve 1100 adjacent to exit port 1122. Blocker plate 1110 also includes a second portion opposite first portion 1300 that is substantially open such that floor surface 1104 of case 1102 is uncovered. In this embodiment, the second portion of blocker plate 1110 includes a first opening 1302 and a second opening 1304. With this arrangement, any fuel that spills onto first portion 1300 of blocker plate 1110 is directed back towards the far side of vent shutoff valve 1100 where the fuel can drain through opening 1202 in case 1102 located under integrated hood 1112.

In an example embodiment, first opening 1302 and second opening 1304 are separated by a connecting member 1306 that joins an outer peripheral edge of blocker plate 1110 with integrated hood 1112, In this embodiment, the second portion of blocker plate 1110 is provided with first opening 1302 and second opening 1304 so as to allow liquid fuel that spills onto floor surface 1104 of case 1102 to drain through opening 1202 in case 1102 under integrated hood 1112 facing away from exit port 1122. In contrast, first portion 1300 of blocker plate 1110 is a substantially continuous surface that covers the majority of floor surface 1104 of case 1102 directly in front of exit port 1122 to prevent the spilled liquid fuel from entering into exit port 1122 and leaking into the evaporative emissions canister. With this arrangement, blocker plate 1110 provides a leak countermeasure for vent shutoff valve 1100.

Figure 15:
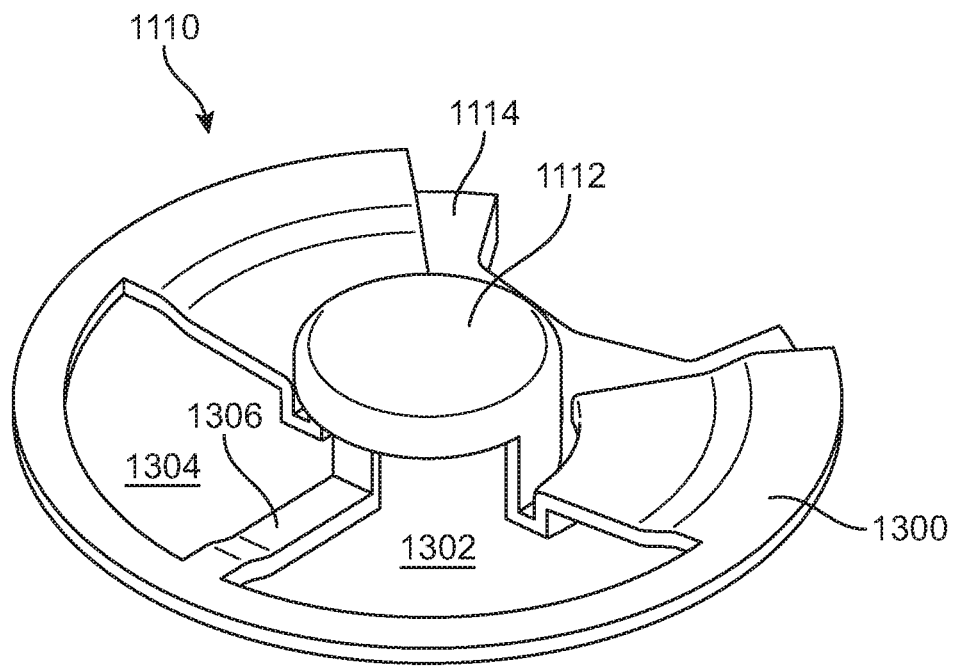
FIG. 15 is an isometric view of the alternate embodiment of the blocker plate of FIG. 12.
Figure 16:
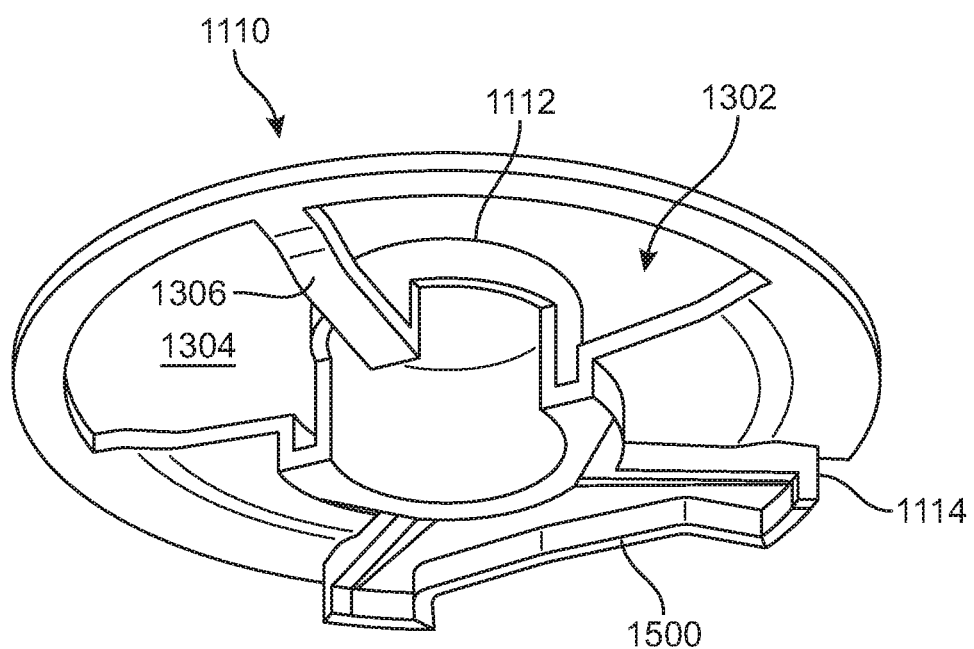
FIG. 16 is an isometric underside view of the alternate embodiment of the blocker plate of FIG. 12.

FIGS. 15 and 16 are isometric views of the example embodiment of blocker plate 1110. Referring now to FIG. 15, an isometric view of a top side of blocker plate 1110 is shown. In this embodiment, first portion 1300 of blocker plate 1110 includes stepped indented region 1114. Stepped indented region 1114 in blocker plate 1110 is configured to correspond to and conform with the shape of a similarly arranged indent in floor surface 1104 of case 1102. Stepped indented region 1114 is located adjacent to exit port 1122 of cover 1120 within vent shutoff valve 1100. Additionally, at stepped indented region 1114 of first portion 1300 of blocker plate 1110, the substantially continuous surface of first portion 1300 of blocker plate 610 steps down in height.

FIG. 16 is an isometric view of the underneath side of blocker plate 1110. In this embodiment, the underside of stepped indented region 1114 of first portion 1300 of blocker plate 1110 is visible. In an example embodiment, the underside of stepped indented region 1114 may further include a lip 1500 that extends around the perimeter of stepped indented region 1114 underneath blocker plate 1110. Lip 1500 may be configured to block liquid fuel from entering into exit port 1122 of cover 1120. That is, lip 1500 provides a physical barrier so that fuel that leaks onto floor surface 1104 of case 1102 on the exit side of vent shutoff valve 1100 is not permitted to flow into exit port 1122.

Figure 17:
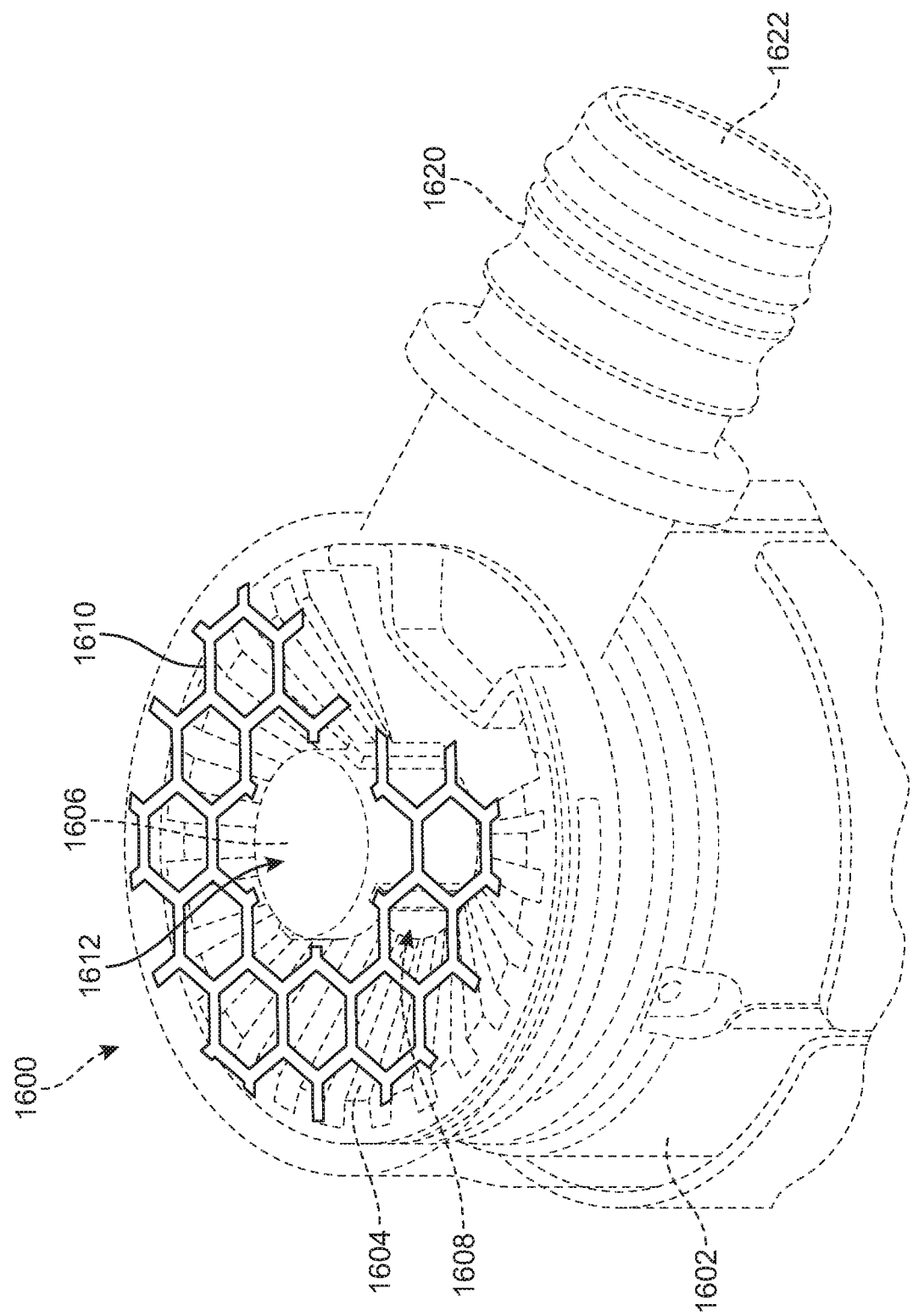
FIG. 17 is an isometric view of an example embodiment of a cover ceiling for a fuel tank vent shutoff valve.
Figure 18:
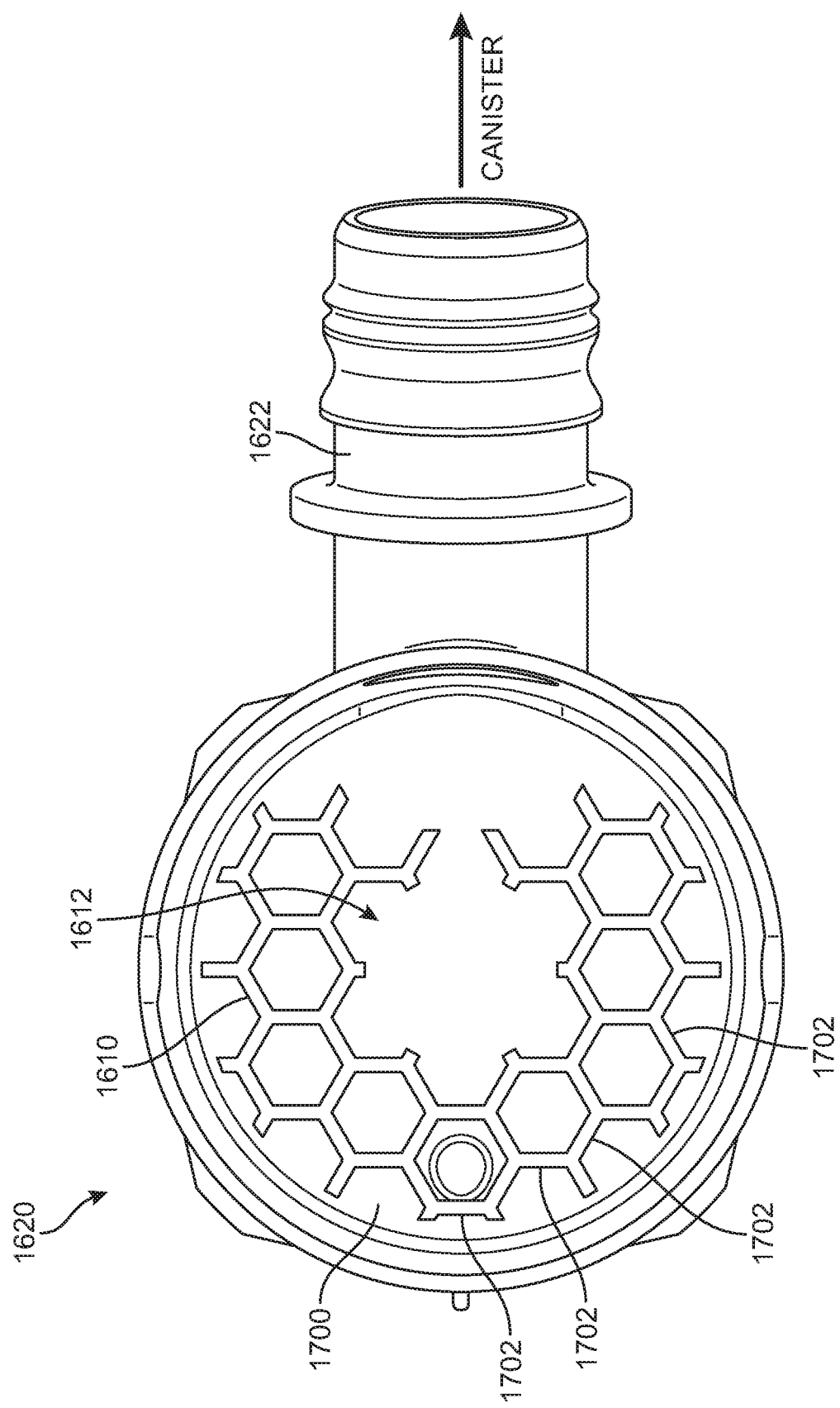
FIG. 18 is an underside view of an example embodiment of the cover ceiling of a fuel tank vent shutoff valve.
Figure 19:
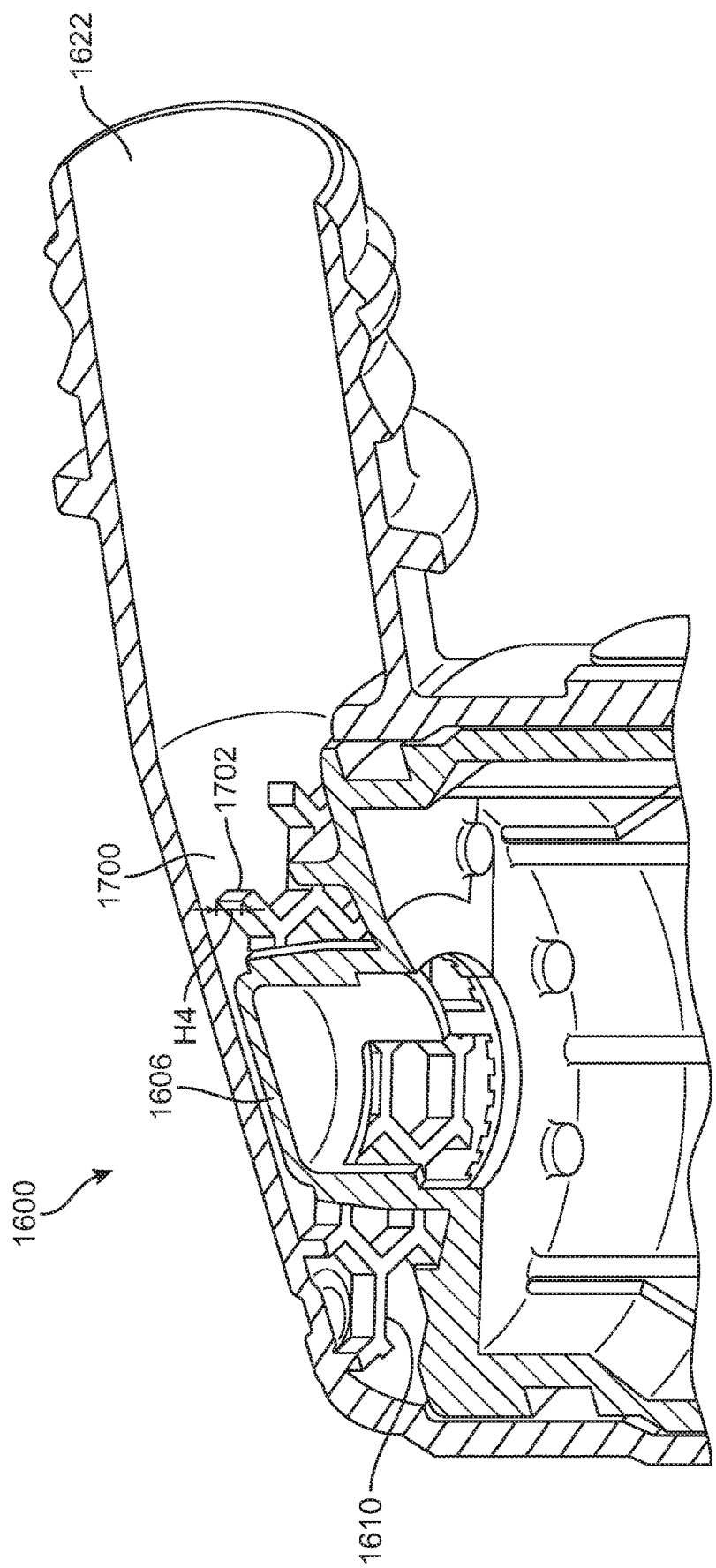
FIG. 19 is an isometric section view of an example embodiment of the cover ceiling of a fuel tank vent shutoff valve.

In some embodiments, a vent shutoff valve may be provided with a cover associated with a leak countermeasure to assist with preventing liquid fuel from flowing into an evaporative emissions canister. FIGS. 17-19 illustrate an embodiment of a ceiling cover for a fuel tank vent shutoff valve that provides a leak countermeasure. Referring now to FIG. 17, an isometric view of an example embodiment of a ceiling cover 1610 for a fuel tank vent shutoff valve 1600 is shown. In this embodiment, vent shutoff valve 1600 has a similar configuration as vent shutoff valve 100, vent shutoff valve 600, and vent shutoff valve 1100 described above. Vent shutoff valve 1600 includes a case 1602 and a cover 1620 disposed over case 1602. Additionally, a valve body (not shown) is disposed within the interior of vent shutoff valve 1600.

As shown in FIG. 17, case 1602 includes a floor surface 1604 surrounding an opening 1608 disposed beneath a central hub 1606. Opening 1608 faces away from an exit port 1622 of cover 1620 leading to an evaporative emissions canister (not shown). In this embodiment, the leak countermeasure for vent shutoff valve 1600 is provided by ceiling cover 1610. Ceiling cover 1610 is configured to extend from an inside surface of cover 1620 towards floor surface 1604 of case 1602. Specifically, ceiling cover 1610 has a honeycomb shape that extends over the inside surface of cover 1620 and is configured to hold liquid fuel by surface tension. In this embodiment, ceiling cover 1620 includes a center aperture 1612 that is configured to fit over central hub 1606 of case 1602 such that central hub 1606 extends through center aperture 1612. This arrangement allows ceiling cover 1620 to trap the liquid fuel and prevent it from moving towards exit port 1622 and leaking into the evaporative emissions canister. The liquid fuel trapped by ceiling cover 1620 falls back onto floor surface 1604 of case 1602 and can then drain through opening 1608 under central hub 1606 back into the fuel tank through vent shutoff valve 1600, FIG. 18 is an underside view of an example embodiment of ceiling cover 1610 for vent shutoff valve 1600, In this embodiment, ceiling cover 1610 is shown extending from inside surface 1700 of cover 1620. As described above, ceiling cover 1610 has a honeycomb shape defined by a plurality of ribs 1702 that are connected to form hexagons. Plurality of ribs 1702 forming the hexagons in the honeycomb shape are configured to trap and hold liquid fuel within the hexagons using surface tension. As described above, the trapped fuel may then accumulate and fall back onto floor surface 1604 of case 1602 and drain through opening 1608.

In this embodiment, ceiling cover 1610 is arranged in a C-shape with a portion of ceiling cover 1610 located adjacent to exit port 1622 of case 1602 being discontinuous on the exit side of cover 1620. With this arrangement, the discontinuity of ceiling cover 1610 on the exit side of cover 1620 may limit any interference with the flow of gasses through exit port 1622 leading to the evaporative emissions canister (not shown).

FIG. 19 is an isometric section view of an example embodiment of ceiling cover 1610 of vent shutoff valve 1600, In this embodiment, ceiling cover 1610 is shown extending from inside surface 1700 of cover 1620 towards floor surface 1604 of case 1602. In an example embodiment, plurality of ribs 1702 forming the hexagons of the honeycomb shape of ceiling cover 1610 extend a fourth height H4 from inside surface 1700 of cover 1620. In this embodiment, plurality of ribs 1702 of ceiling cover 1610 are formed integrally with cover 1620 and extend from inside surface 1700. In other embodiments, however, ceiling cover 1610 may be formed as a separate component that is configured to rest along or near inside surface 1700 of cover 1620.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A fuel tank vent shutoff valve comprising:
   a valve body;
   a case disposed over the valve body, the case including a floor surface surrounding an opening;
   a cover disposed over the case, the cover including an exit port extending radially from the cover on an exit side;
   wherein the case includes a flange structure extending away from the floor surface towards an inside surface of the cover;
   wherein the inside surface of the cover includes an annular wall aligned over the opening and extending away from the inside surface towards the floor surface of the case, the annular wall comprising a first section disposed adjacent to the exit port on the exit side and a second section disposed radially opposite the first section, wherein the first section has a first height that is greater than a second height of the second section; and
   wherein a free end of the first section of the annular wall extends past a free end of the flange structure of the case on the exit side.

2. The fuel tank vent shutoff valve of claim 1, wherein the flange structure of the case comprises an inner semi-circular portion disposed adjacent to the opening.

3. The fuel tank vent shutoff valve of claim 2, wherein the free end of the flange structure is located on the inner semi-circular portion.

4. The fuel tank vent shutoff valve of claim 2, wherein the flange structure of the case further comprises a plurality of finger members extending from the inner semi-circular portion.

5. The fuel tank vent shutoff valve of claim 2, wherein the flange structure of the case further comprises an outer peripheral portion.

6. The fuel tank vent shutoff valve of claim 5, wherein the flange structure of the case further comprises a connecting member that is attached to the inner semi-circular portion and the outer peripheral portion.

7. The fuel tank vent shutoff valve of claim 6, wherein the flange structure of the case further comprises a finger member extending outward from the connecting member.

8. The fuel tank vent shutoff valve of claim 5, wherein the outer peripheral portion further comprises a plurality of projections extending towards the opening on a side of the case opposite to the exit port of the cover.

9. The fuel tank vent shutoff valve of claim 1, wherein the annular wall has a circular shape that is larger than a circular shape of the opening in the floor surface of the case.

10. The fuel tank vent shutoff valve of claim 1, further comprising a plurality of liquid catch areas on the case configured to trap liquid fuel so as to stop the liquid fuel from entering the exit port.

11. The fuel tank vent shutoff valve of claim 10, wherein the plurality of liquid catch areas include at least one liquid catch area defined by a part of an inner semi-circular portion of the flange structure and one or more finger members extending from the inner semi-circular portion.

12. The fuel tank vent shutoff valve of claim 10, wherein the plurality of liquid catch areas are sloped so that the trapped liquid fuel is directed in a downward direction towards the opening.

13. The fuel tank vent shutoff valve of claim 11, wherein the flange structure of the case further comprises:
    an outer peripheral portion; and
    a connecting member that is attached to the inner semi-circular portion and the outer peripheral portion;
    wherein the at least one liquid catch area of the plurality of liquid catch areas is defined by a finger member of the one or more finger members extending outward from the connecting member and at least one part of the inner semi-circular portion or the outer peripheral portion.

14. A case for a fuel tank vent shutoff valve, the case comprising:
    a floor surface surrounding an opening, wherein the opening is configured to provide fluid access to a valve body of the fuel tank vent shutoff valve;
    a flange structure extending away from the floor surface on an exit side adjacent to an exit port of the fuel tank shutoff valve;
    wherein a free end of the flange structure is configured to extend past a free end of an annular wall of a cover aligned over the opening and extending towards the floor surface of the case such that the annular wall of the cover is located between the opening and the flange structure on the exit side; and
    wherein the free end of the flange structure and the free end of the annular wall cooperate to block liquid fuel from entering into the exit port.

15. The case of claim 14, wherein the flange structure of the case comprises an inner semi-circular portion disposed adjacent to the opening.

16. The case of claim 15, wherein the free end of the flange structure is located on the inner semi-circular portion.

17. The case of claim 15, wherein the flange structure further comprises a plurality of finger members extending from the inner semi-circular portion.

18. The case of claim 15, further comprising at least one liquid catch area defined by a part of the inner semi-circular portion of the flange structure and one or more finger members extending from the inner semi-circular portion.

19. The case of claim 15, wherein the flange structure further comprises an outer peripheral portion and a connecting member that is attached to the inner semi-circular portion and the outer peripheral portion.

20. The case of claim 19, further comprising at least one liquid catch area defined by a finger member extending outward from the connecting member and at least one part of the inner semi-circular portion or the outer peripheral portion.

* * * * *